United States Patent [19]

Dietz et al.

[11] 4,197,567
[45] Apr. 8, 1980

[54] PORTABLE GROUND FAULT CIRCUIT INTERRUPTER

[75] Inventors: Robert E. Dietz, Cedar Rapids; Henry J. Zylstra, Alburnette, both of Iowa

[73] Assignee: Square D Company, Palatine, Ill.

[21] Appl. No.: 888,704

[22] Filed: Mar. 20, 1978

Related U.S. Application Data

[63] Continuation of Ser. No. 715,469, Aug. 18, 1976, abandoned, which is a continuation of Ser. No. 486,045, Jul. 5, 1974, abandoned.

[51] Int. Cl.² .............................................. H02H 3/28
[52] U.S. Cl. ..................................... 361/45; 335/253; 361/117
[58] Field of Search ............... 361/45, 44, 46, 42, 361/88, 90, 92, 114, 115; 335/20, 6, 18, 21, 24, 38, 171, 170, 172, 174, 253, 254

[56] References Cited

U.S. PATENT DOCUMENTS

| | | | |
|---|---|---|---|
| 3,539,867 | 11/1970 | Edmunds | 361/45 |
| 3,633,070 | 1/1972 | Vassos et al. | 251/270 |
| 3,723,924 | 3/1973 | Shaffer et al. | 335/169 |
| 3,843,908 | 10/1974 | Priegnitz | 361/89 |

*Primary Examiner*—Patrick R. Salce
*Attorney, Agent, or Firm*—Norton Lesser; Larry I. Golden; Richard T. Guttman

[57] ABSTRACT

A ground fault circuit interrupter which utilizes one trip coil to perform the combined functions of interrupting a circuit on occurrence of a ground fault as well as an under voltage condition. An electronic module supplies continuous current to the trip coil until a ground fault or under voltage condition occurs. The armature is spring biased in a direction away from the trip coil, with tension of the spring adjusted to pull the armature away from the trip coil when voltage in the coil decreases below a selected amplitude.

4 Claims, 4 Drawing Figures

PORTABLE GROUND FAULT CIRCUIT INTERRUPTER

This is a continuation of application Ser. No. 715,469, filed Aug. 18, 1976, now abandoned, which in turn was a continuation of application Ser. No. 486,045, filed July 5, 1974, now abandoned.

BACKGROUND OF THE INVENTION

In order to comply with certain industry standards and safety provisions, ground fault interrupters often include an under voltage relay. Prior devices have included two trip coils, one to interrupt the circuit on occurrence of a ground fault and the other to do so on occurrence of an under voltage condition.

This invention enables one trip coil to perform both functions thus reducing cost and the space required for an extra coil.

SUMMARY OF THE INVENTION

It is an object of this invention to provide a ground fault circuit interrupter which includes a single coil, circuit means responsive to decrease voltage in said coil upon occurrence of either a ground fault current or an under voltage condition, and a mechanically biased armature under sufficient tension to urge said armature away from said coil when voltage therein decreases below a selected amplitude.

It is an object of this invention to provide a ground fault circuit interrupter which incorporates under voltage protection utilizing common elements to perform dual functions.

It is an object of this invention to provide a ground fault circuit interrupter which incorporates under voltage protection in a device requiring minimum space.

DESCRIPTION OF PREFERRED EMBODIMENT

Figure 1:
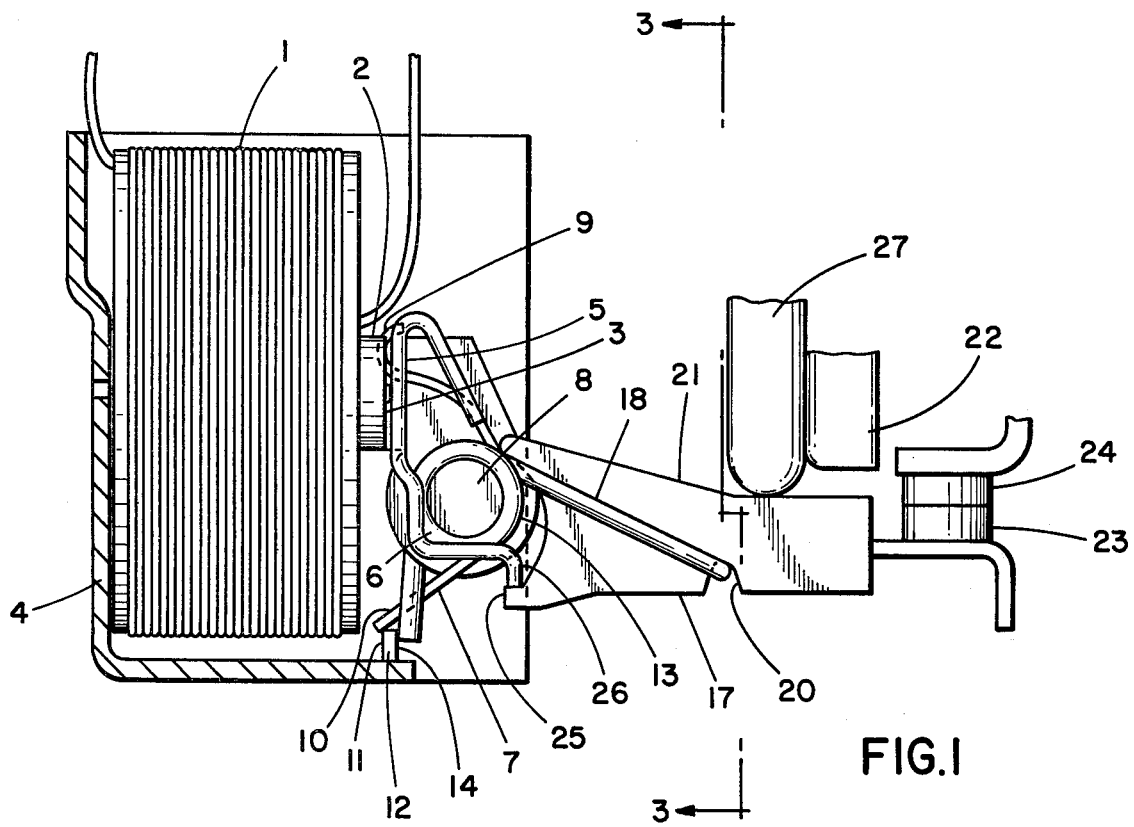
FIG. 1 is a side elevation view of a ground fault circuit interrupter in accordance with this invention, with certain parts in section and others broken away, showing the contacts in closed position.

A ground fault circuit interrupter in accord with this invention includes trip coil 1 wound on magnetic core 2 having a projecting pole face 3. The coil is mounted on frame 4 with pole face 3 in position to attract armature 5 which is mounted to rotate on armature pivot 6 between a position in contact with and out of contact with pole face 5. Bias coil spring 7 is mounted on lateral shaft 8, with moveable spring end 9 secured to armature 5 and retained spring end 10 abutting the coilfacing side 11 of spring retaining ledge 12. Bias coil spring 7 thus provides a bias to urge armature 5 away from pole face 3.

Main coil spring 13 is also mounted on lateral shaft 8, having retained end 14 abutting the contact-facing side 15 of spring retaining ledge 12 and having a center span 16 positioned to cradle contact carrier member 17 between lever arms 18 with cross arm 19 seating in lateral groove 20 of carrier member 17. Main coil spring 13 thus provides a bias to urge the body 21 of carrier member 17 against contact pivot 22 thereby moving carrier contact 23 away from stationary contact 24 to open the circuit protected by the ground fault interrupter.

Contact 23 and 24 open and close a power circuit protected by the interrupter.

Carrier member 17 includes a transverse lip 25 projecting rearward therefrom for engagement with forwardly extending armature flange 26 when armature 5 is in contact with pole face 3 during normal operating energization of coil 1. Reset button 27 is depressable manually to bear against a portion of carrier body 21 oppositely of and slightly forward of lateral groove 20 in which cross arm 19 of main spring 13 seats to apply a bias opposing the thrust of reset button 27 against carrier body 21. When reset button 27 is manually depressed to bear against carrier body 21, carrier member 17 moves against the tension of main spring 13 from a contact open position to a contact closed position whereupon transverse lip 25 projecting rearward from carrier 17 is engaged by armature flange 26 to lock carrier member 17 in contact closed position. The contacts 23 and 24 are held together in closed position until the voltage on coil 1 drops below a pre-selected amplitude, enabling bias coil spring 7 to overcome the magnetic attraction force of pole face 3 and urge armature 5 away from contact therewith. As armature 5 is urged away from pole face 3 it rotates on pivot 6 causing armature flange 26 to disengage from transverse lip 25 of carrier member 17. The biasing cross arm 19 of main spring 13 is thereupon free to move carrier member 17 in the direction which causes carrier 17 to engage contact pivot 22 causing carrier member 17 to pivot to a contact open position, separating carrier contact 23 from stationary contact 24. The protected circuit is thereby interrupted as a result of the said drop in voltage on trip coil 1 below a pre-selected amplitude, which occurs on appearance of a ground fault or an under voltage condition in the protected circuit.

Figure 4:
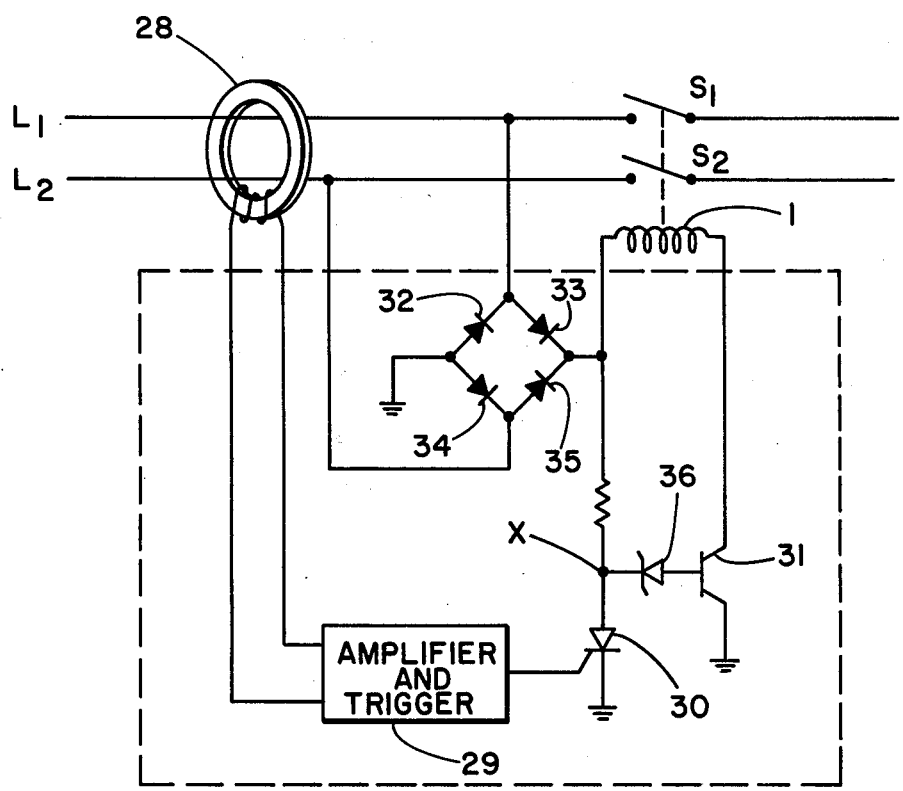
FIG. 4 is a schematic drawing illustrating a circuit and components for use in the ground fault interrupter of this invention.

FIG. 4 illustrates schematically a control circuit which causes a drop in voltage to occur in trip coil 1 on appearance of a ground fault or under voltage condition. A differential transformer 28 encompasses power lines L1 and L2 to detect a ground fault on appearance in said lines, which causes amplifier 29 to provide an input to silicon-controlled rectifier 30 which then conducts.

During normal circuit conditions, when power line L1 is positive with respect to L2, current flows from L1 through diode 33, trip coil 1, n-p-n transistor 31 and diode 34 to L2. When L2 becomes positive with respect to L1, current flow is from L2 through diode 35, trip coil 1, n-p-n transistor 31 and diode 32 to L1. Diodes 32, 33, 34 and 35 are thus connected to provide a full wave rectifier circuit between transistor 31 and power lines L1 and L2.

When a ground fault is detected by differential transformer 28 causing an input to SCR 30, the SCR 30 conducts resulting in a low voltage at junction X. A zener diode 36 prevents current from flowing in the base of transistor 31 and the transistor 31 goes into a non-conducting or "off" state. The current in trip coil 1 is thereby interrupted, whereupon the bias spring 7 overcomes the magnetic attraction force of pole face 3 and urges armature 5 away therefrom causing the protected circuit to be interrupted as armature flange 26 disengages from transverse lip 25 permitting contacts 23 and 25 to open.

Similarly, when line voltage drops to a pre-determined level, or in the event one of the power lines L1 or L2 is severed, the trip coil 1 releases the biased armature 5 and interrupts the protected circuit in the manner described.

Figure 2:
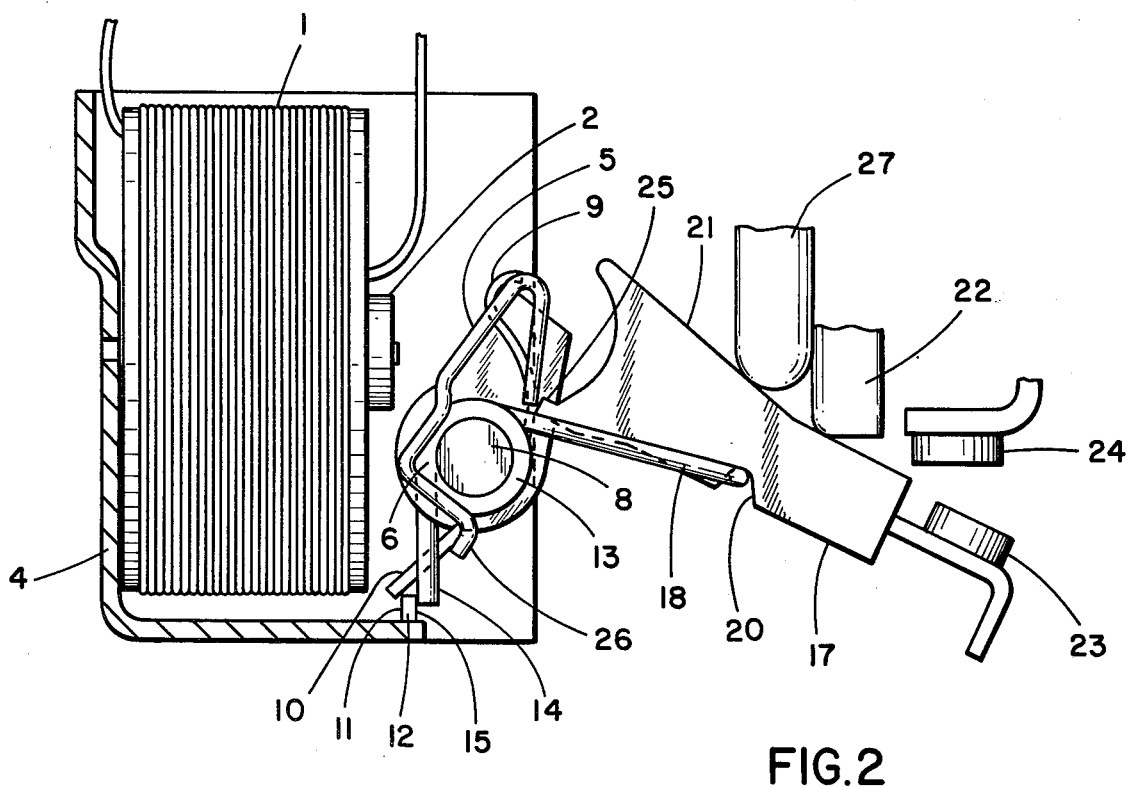
FIG. 2 is a side elevation view of the device of FIG. 1 showing the contacts in open position.
Figure 3:
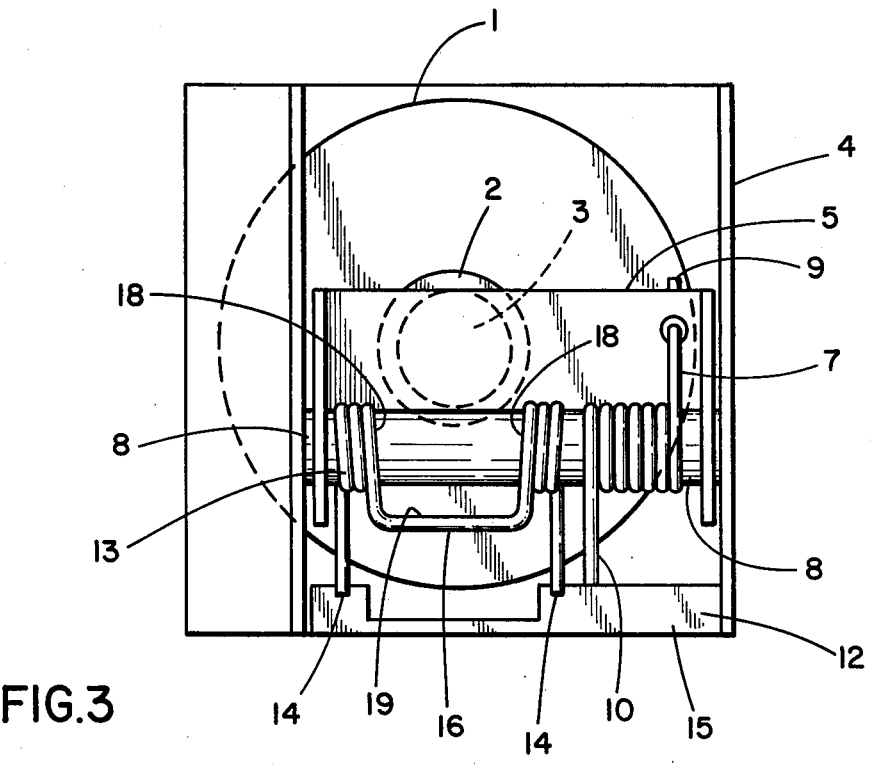
FIG. 3 is an end elevation of a main spring and armature bias spring taken on line 3—3 of FIG. 1.

Reset button 27 is mounted for reciprocal movement through frame 4 or other support to engage the body 21 of carrier member 17 adjacent contact pivot 22. After carrier member 17 has been rotated to a contact open position as shown in FIG. 2, the interrupter is reset by depressing re-set button 27 which urges carrier member 17 against the bias of main coil spring 13 to a contact closed position as shown in FIG. 1. If the fault current or under voltage condition is no longer present, trip coil 1 again is energized attracting armature 5 to pole face 3 and positioning armature flange 26 to engage transverse lip 25 of contact carrier member 17. When so engaged, contacts 23 and 24 are closed and maintained in releasably locked position until a fault current or under voltage condition again occurs.

I claim:

1. A portable ground fault power circuit interrupter for use with a power circuit independent of a circuit breaker and including a frame and at least two conductors, said interrupter having ground fault sensing means for sensing the occurrence of a ground fault signal on one of said conductors, said interrupter comprising:

a single magnetic core and coil, an armature operatively associated with and normally attracted to said magnetic core in response to energization of said coil by a current above a predetermined value, said armature having a flange portion at its lower end adapted to be received by a carrier member, power circuit contact means including a movable carrier member carrying a contact and controlled by said armature for extending said power circuit through said contact in response to the energization of said coil by said current above said predetermined value, said carrier member including a transverse lip portion adapted to receive said flange portion, mechanical biasing means for biasing said armature from said magnetic core and moving said carrier member and contact to interrupt said power circuit in response to the current in said magnetic coil falling below said predetermined value, control circuit means including rectifier supply means connected to said power circuit, first switch means in said control circuit in a normally conducting state when said control circuit is powered by said rectifier supply means for energizing said coil, a second switch means controlled in response to the sensing of a ground fault above said preselected magnitude, threshold switch actuating means having internal circuit responsive variable resistance characteristics for controlling said first switch means to render said first switch means non-conducting and thereby interrupt current in said coil in response to the control of said second switch by said ground fault current above said preselected magnitude, said armature, carrier and contact moved by said biasing means in response to said coil being energized by a current below said predetermined value for interrupting said power circuit, a first conductor extending between said rectifier supply means and said second switch means, a second conductor connected at one end to said first conductor at a junction point thereon between said rectifier supply means and said second switch means and at the other end to said first switch means, said threshold switch actuating means being connected in series in said second conductor between said junction point and said first switch means, and a reset member having an elongate axis and movable solely along said axis in either a first direction or a second direction, said reset member having one end extending through said frame and an opposite end directly engaged with said carrier member and manually movable in said first direction for moving said carrier and contact against said bias to move said armature toward said core to engage said transverse lip portion of said carrier with said flange portion of said armature and enable said armature to control said contact for extending said power circuit in response to the current in said power circuit being above said predetermined value and moved in said second direction by the bias on said carrier member in response to said coil being energized by a current below said predetermined value and the subsequent disengagement of said transverse lip portion of said carrier by said flange portion of said armature.

2. A ground fault power circuit interrupter as claimed in claim 1, wherein said ground fault sensing means includes amplifier means to amplify a ground fault signal and having one output corresponding to the absence of a ground fault signal and another output corresponding to a ground fault signal, said second switch means in said control circuit is connected in series with the output of said amplifier means, said second switch means having a non-conducting state in response to said one output of said amplifier and rendered conductive by the other output from said amplifier means in response to a ground fault signal, said second switch means connected in series with said rectifier supply means and in parallel with said threshold switch actuating means for controlling said threshold switch means in response to the switching of said second switch means to a conducting state by the other output from said amplifier for reducing the current through said coil below said predetermined value for moving said carrier member to interrupt said power circuit.

3. A ground fault power circuit interrupter as set forth in claim 2 wherein said first control circuit switch means is a transistor and said control circuit second switch means is a silicon controlled rectifier.

4. A ground fault power circuit interrupter as set forth in claim 2, wherein said threshold switch actuating means is a zener diode.

* * * * *